June 1, 1926.

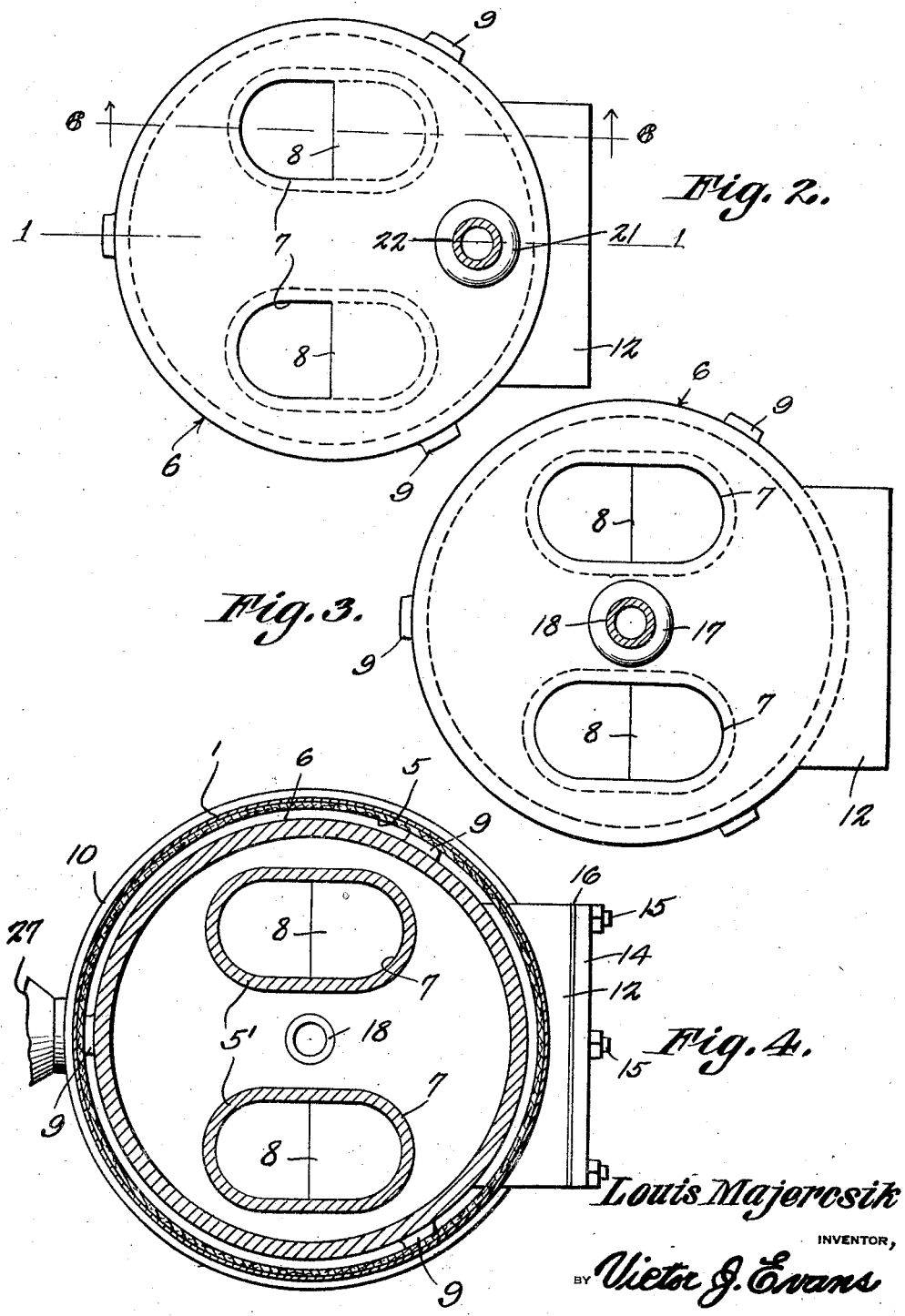

L. MAJERCSIK 1,587,393

WATER HEATER

Filed April 8, 1924     3 Sheets-Sheet 3

Louis Majercsik INVENTOR

BY Victor J. Evans ATTORNEY.

Patented June 1, 1926.

1,587,393

UNITED STATES PATENT OFFICE.

LOUIS MAJERCSIK, OF BARBERTON, OHIO.

WATER HEATER.

Application filed April 8, 1924. Serial No. 705,085.

An object of this invention is to simplify and improve the existing art by producing a heating device for water, in which a large volume of water will be effectively heated in its passage through the device.

Another object is to produce an air-tight water heater in which the heating agent is either natural or artificial gas, and which agent is conducted through flues provided with baffles around which flues the water to be heated is received, so that the passage of the heat units through the flues will be baffled to thoroughly heat the water adjacent to the flues.

A still further object is the production of an air-tight water heater in which the liability of clogging by the dirt contained in water passing therethrough will be effectively eliminated.

To the attainment of the foregoing and other objects which will present themselves as the nature of the invention is better understood, reference is to be had to the drawings which accompany and which form part of this application.

In the drawings:—

Figure 2 is a top plan view of the drum, the water outlet pipe being in section.

Figure 3 is a bottom plan view of the drum, the water inlet pipe being in section.

Figure 4 is a sectional view on the line 4—4 of Figure 1.

Figure 1:
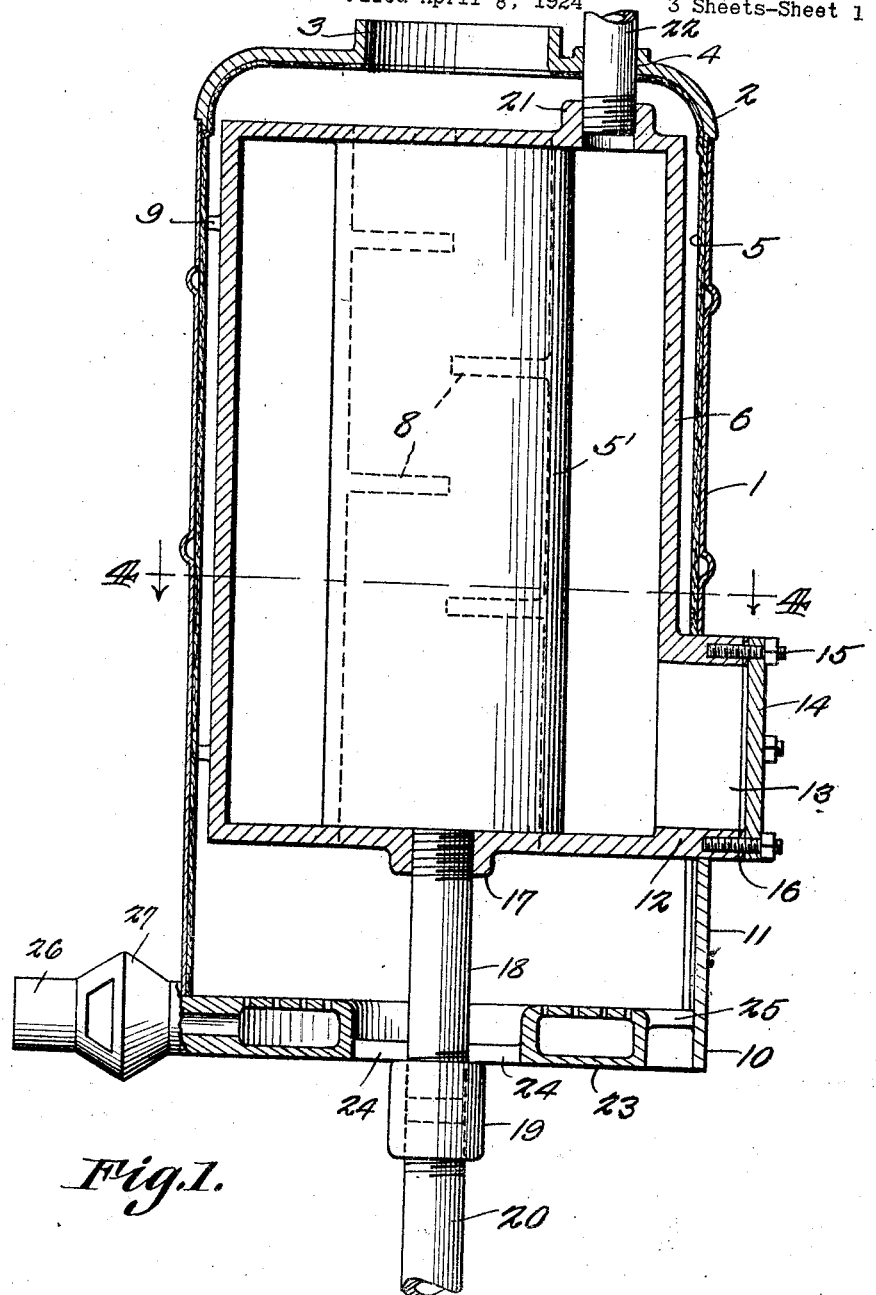
Figure 1 is a sectional elevation on the line 1—1 of Figure 2.
Figure 5:
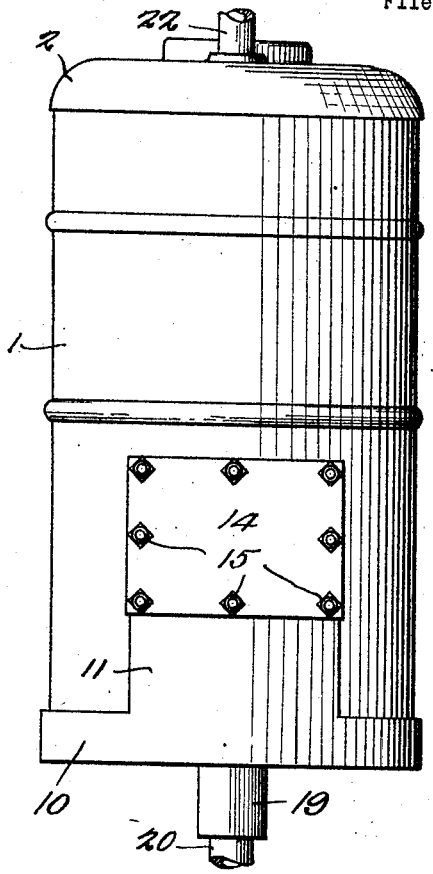
Figure 5 is an elevation of the heater.
Figure 6:
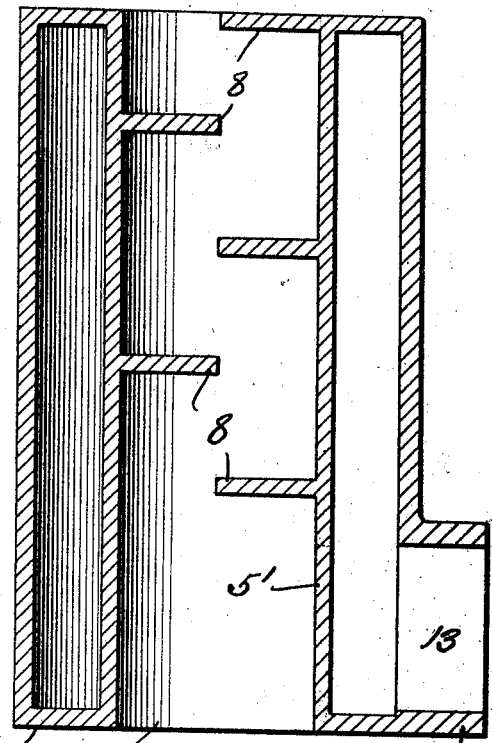
Figure 6 is a sectional view on the line 6—6 of Figure 2.
Figure 7:
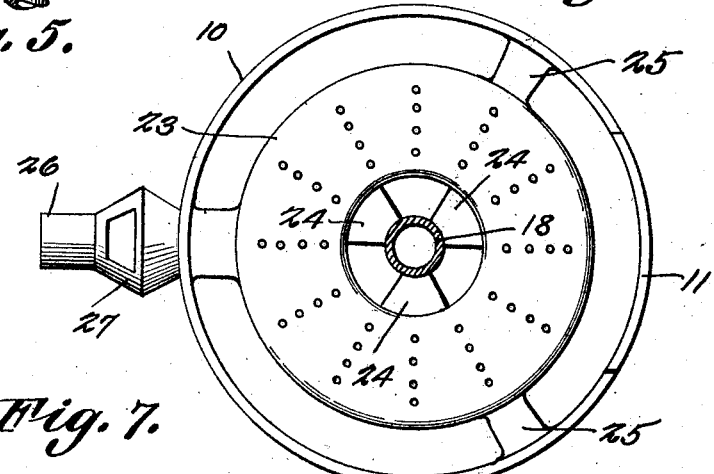
Figure 7 is a plan view of the burner, the water inlet pipe which passes through the center of the said burner being in section.

As disclosed by the drawings, I make use of an outer jacket 1 of suitable metal having both of its ends open. The jacket 1, is however, closed at its upper end by a hollow head 2 provided with openings 3 and 4 respectively. The openings are surrounded by bosses.

The jacket 1, and preferably the interior of the head 2 have facings of non-heat conducting substances such as asbestos 5.

In the jacket 1, and spaced from the walls thereof there is a hollow member in the nature of a drum 6. The drum is provided, at points equidistant from the center thereof, with two longitudinally extending flues 7. These flues are elliptical in cross section and have extending from their end walls staggeredly related baffle plates 8 for causing the heat units passing therethrough to take a tortuous path and effectively heat the water in the drum. For distinction the confronting walls of the flues 7 are indicated by the numeral 5'.

The drum 6 is held in spaced relation from the jacket 1 by lugs 9 which may be integrally formed between these elements or may be in the nature of plates which are riveted or otherwise secured thereto.

The lower open end of the jacket 1 is received in a flanged ring 10, the said ring having at what I will term its rear an upstanding flange 11 which is received in and closes the lower portion of an opening in the jacket and which flange is riveted or otherwise secured to the jacket 1. The flange 11 abuts with an outwardly directed boss 12 formed on the drum 6 and passing through the opening in the jacket 1. The boss 12 is formed with an opening 13 that communicates with the drum. The opening is normally closed by a cover plate 14, bolted by means 15 to the boss. Between the plate 14 and the boss there is a packing 16 to insure a water-tight joint therebetween. This provides a means whereby access may be obtained to the water chamber in the drum.

The closed bottom of the drum, between the flues 7 is provided with a threaded opening surrounded by a boss 17. Screwed in this opening there is a pipe 18 connected by a coupling 19 with a second pipe 20 that leads to the house water supply. The closed top of the drum 6 is provided with an opening opposite the opening 4 in the head 2, the said opening being surrounded by a boss 21 having interior threads and in which boss there is screwed a pipe 22 that passes through the opening 4 and provides a water outlet from the water compartment in the drum 6.

In the ring member 10 there is a single apertured burner 23. The inner edge of this burner is formed with lugs 24 having their outer edges arcuate for contacting engagement with the pipe 18. Preferably the coupling 19 rests on the outer faces of the bosses 24 for effectively sustaining the burner in the jacket 1. On its outer periphery the burner is formed with lugs 25 which contact with the ring member 10. The lugs 25 may be cast with the burner or with the ring member.

The gas inlet pipe for the burner is indicated by the numeral 26, the same having a valve regulated air mixing chamber 27, the inlet pipe being connected with the house gas supply.

A lighted match is inserted through the ring-like base of the device for igniting the burner. The heat from the burner contacts the base of the drum and is obstructed in its passage through the flues 7 by the baffle plates 8 therein. The heat also passes between the outer wall of the drum and the inner wall of the jacket so that the water in the drum will be thoroughly heated in its passage therethrough. The flue opening in the top of the head 2 is connected by a pipe (not shown) to the flue of a chimney in the house where the device is installed. The construction is such that liability of clogging the drum by muddy water therein is entirely overcome and the superiority of the construction over coil heaters, in this respect, will be appreciated.

While I have herein set forth a satisfactory embodiment of my improvement as it now appears to me it is to be understood that I do not wish to confine myself to the precise structural details disclosed, but may make such changes therefrom as fairly fall within the scope of what I claim.

Having described the invention, I claim:—

A water heater including a jacket having a rectangular opening in one side entering from the bottom thereof, a ring on which the jacket is supported and having an upstanding flange entering and partly closing the opening in the jacket, a water drum in the jacket spaced therefrom and having an outwardly directed hollow boss on the lower portion thereof, provided with a water tight closure and received through the opening in the jacket and resting on the flange of the ring, said drum having a pair of spaced flues, extending longitudinally therethrough and which are elliptical in plan and provided with inwardly extending staggeredly related baffle plates, a water inlet pipe communicating with the bottom of the drum between the flues, a water outlet pipe between the top of the drum and the top of the jacket and lugs integrally formed on the drum contacting with the inner face of the jacket for holding the drum spaced from the jacket.

In testimony whereof I affix my signature.

LOUIS MAJERCSIK.